United States Patent [19]

Liu

[11] Patent Number: 4,991,255

[45] Date of Patent: Feb. 12, 1991

[54] PNEUMATIC DOOR-CLOSER USABLE FOR LEFT-HINGED AND RIGHT-HINGED DOORS

[76] Inventor: James C. Liu, No. 308, Fu-Sheng Tsun, Hsin-Sheh Hsiang, Taichung Hsien, Taiwan

[21] Appl. No.: 388,143

[22] Filed: Aug. 1, 1989

[51] Int. Cl.⁵ ............................................. E05F 3/00
[52] U.S. Cl. ......................................... 16/70; 16/58
[58] Field of Search .................... 16/70, 66, DIG. 10, 16/DIG. 9, DIG. 21, 58, 84, 71

[56] References Cited

U.S. PATENT DOCUMENTS

| | | | |
|---|---|---|---|
| 893,185 | 7/1908 | Mick | 16/70 |
| 3,934,306 | 1/1976 | Farris | 16/70 |
| 4,287,639 | 9/1981 | Denton | 16/71 |
| 4,817,238 | 4/1989 | Liu | 16/58 |

Primary Examiner—Richard K. Seidel
Assistant Examiner—Chuck Y. Mah
Attorney, Agent, or Firm—Ladas & Parry

[57] ABSTRACT

A pneumatic door-closer includes a door-closer body pivoted to a generally L-shaped crank unit which is mounted pivotally on a support. The unit includes a long crank arm member and a short crank arm member, and can be adjusted to change the positions of the members relative to the support. The adjustable connection of the crank unit to the support enables the door-closer to work regardless of whether the left or the right side of the associated door is hinged to a door frame. The piston rod of the body has a right-hand screw portion engaged threadedly with a piston body, and a left-hand screw end portion engaged with a nut for retaining the piston body on the piston rod.

3 Claims, 9 Drawing Sheets

PNEUMATIC DOOR-CLOSER USABLE FOR LEFT-HINGED AND RIGHT-HINGED DOORS

BACKGROUND OF THE INVENTION

This invention relates to a door-closer, more particularly to a pneumatic door-closer which can perform door closing function regardless of whether the left or the right side of the door is hinged to a door frame.

U.S. Pat. No. 4,817,238 discloses an invention of mine relating to a pneumatic door-closer in which a piston body is retained on a piston rod by means of a C-shaped retaining ring. However, in use, the retaining ring still has the possibility of loosening from the piston rod. Furthermore, compressed air can flow through the axial and radial passages of the piston body in opposite directions causing stress to concentrate on the walls defining these passages. This stress concentration reduces the lifetime of the piston body. In addition to the arrangement of the retaining ring and the passages, the improvement of this invention is also directed to a conventional door-closer which is applicable only to either of the doors 100, 200 shown in FIG. 1, but not to both of them. From an economical standpoint, it is desirable to provided with a door-closer that is applicable to both of the doors 100, 200.

SUMMARY OF THE INVENTION

An object of this invention is to provide a pneumatic door-closer with an arrangement of right-hand and left-hand screws whereby a piston body is inseparable from a piston rod.

Another object of this invention is to provide a door-closer which can be used on a door regardless of whether the right or the left side of the door is hinged to a door frame.

Still another object of this invention is to provide a door-closer with a durable piston body which has an improved passage arrangement.

According to this invention, a door-closer is interposed between a door and a door frame. The door has a first side hinged to the door frame, and a second side opposite to and rotatable about the first side. The door-closer includes an elongated horizontal support fixed on the door frame above the door, and a vertical pivot assembly for removably pivoting a generally L-shaped crank unit to one end of the support. The crank unit includes a long crank arm member and a short crank arm member which inclines at an angle with respect to the long crank arm member. The long crank arm member is connected to one side of the short crank arm member and includes a crank pin unit carried at the end of the long crank arm member. A connector is fixed on the door and has a slide slot formed therethrough in which the crank pin unit of the long crank arm member is slidably received. A door-closer body includes an air cylinder filled with compressed air, and a piston rod extending through one end of the cylinder to connect pivotally with the end of the short crank arm member. The other end of the cylinder is mounted pivotally on the other end of the support. The cylinder includes a piston body which is sleeved movably on the piston rod so as to define in the cylinder a first and a second sealed chambers. The piston body includes a central bore formed therethrough, a wedge-shaped groove formed in the inner surface of the piston body in communication with the second chamber, an axial passage formed through the piston body intercommunicating the first and second chambers, a spring-biased seal disposed in the second chamber and biased to close the axial passage, and a radial passage intercommunicating the groove and the first chamber. The piston rod has a shoulder which is movable axially in the central bore of the piston body to seal entirely or partially the groove by moving the piston rod relative to the cylinder, thereby regulating the air flow between the first and second chambers. When the door is alternatively hinged to the door frame at the second side instead of the first side thereof, the crank unit can be rearranged in such a manner that the long crank arm member is connected to the other side of the short crank arm member, so that the door-closer can still be utilized to perform the same door closing function. The piston body has an internally threaded portion. The piston rod includes a right-hand screw portion engaged threadedly within the internally threaded portion of the piston body, a left-hand screw end portion adjacent to the right-hand screw portion, and a nut engaged with the left-hand screw end portion, thereby retaining the piston body on the piston rod.

BRIEF DESCRIPTION OF THE DRAWINGS

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
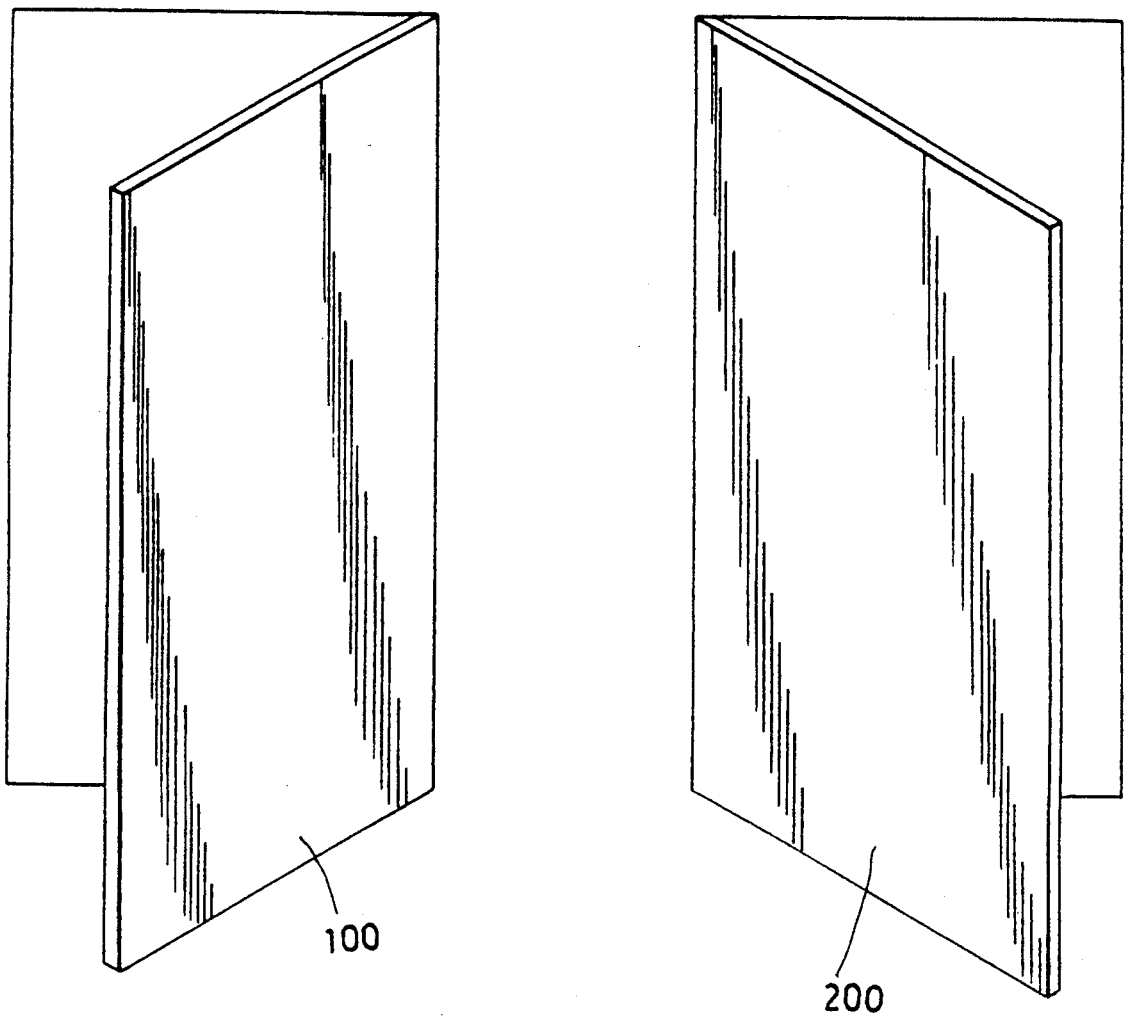
FIG. 1 shows two doors which are respectively hinged to a door frame at different sides thereof.
Figure 2:
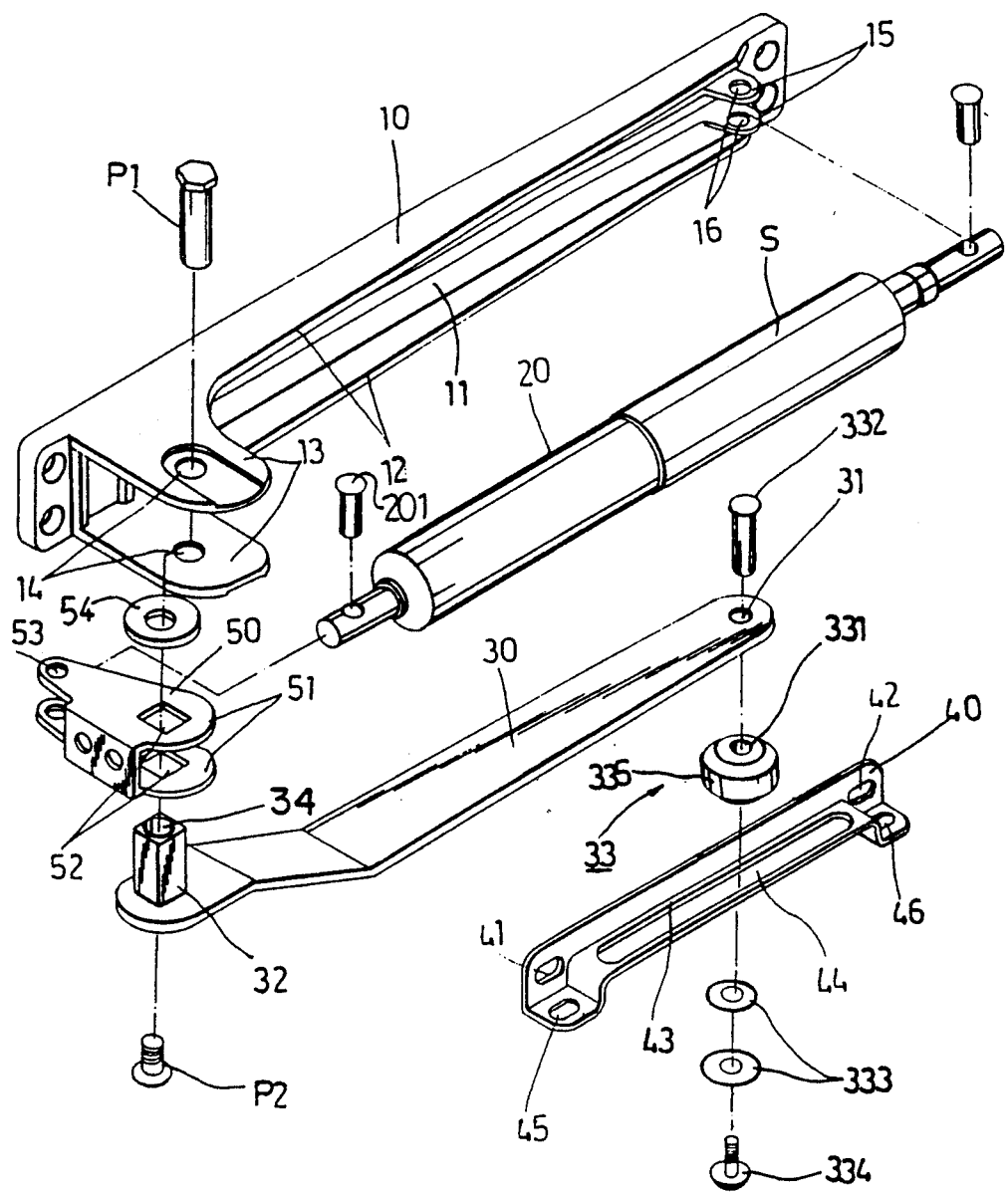
FIG. 2 is an exploded view of a door-closer according to this invention.
Figure 6:
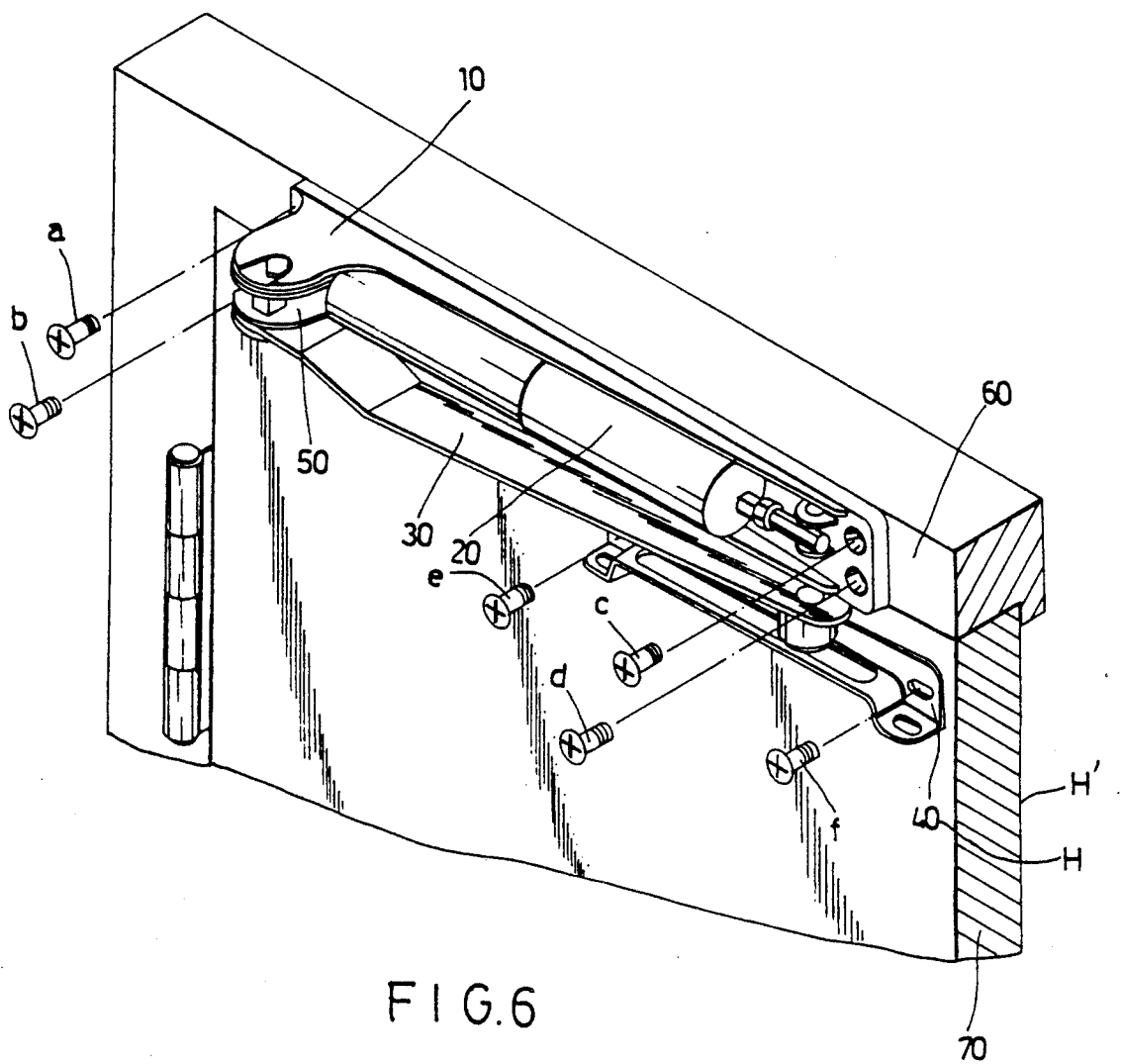
FIGS. 6 and 7 are schematic views illustrating how to utilize the door-closer of this invention on a door which is hinged to a door frame at the left side thereof.

Referring to FIGS. 2 and 6, a pneumatic door-closer of this invention includes an elongated horizontal support 10, a door-closer body 20, a long crank arm member 30, a connector 40, and a short crank arm member 50. The long member 30 and the short member 50 together constitute a generally L-shaped crank unit and form an angle of about 115 degrees therebetween. The support 10 has a bottom wall 11 and two parallel side walls 12. Two aligned large lugs 13 are provided on the left end of the support 10 and have circular holes 14 formed therethrough. Two aligned small lugs 15 are provided on the right end of the support 10 and have circular holes 16 formed therethrough. As illustrated the bottom wall of the support 10 has fastener holes so as to screw the support 10 to a door frame 60 with bolts (a, b, c, d). The body 20 has a circular hole formed through the right end thereof so as to mount pivotally the body 20 on the small lugs 15. The long member 30 has an inclined intermediate portion interconnecting the parallel left and right end portions. The right end portion of the long member 30 has a circular hole 31 formed therethrough. The connector 40 has a vertical portion with fastener holes 41, 42, and a horizontal portion 43. The horizontal portion 43 has an upper, horizontal intermediate portion with a slide slot 44, and two lower, horizontal end portions with fastener holes 45, 46. Bolts (e, f) are passed through the fastener holes 41, 42 of the vertical portion of the connector 40 so as to fasten the connector 40 to the hinged front surface (H) of a door 70 which is hinged to the door frame 60 at the left side thereof. Alternatively, the bolts (e, f) may be passed through the fastener holes 45, 46 of the horizontal portion of the connector 40 to engage within the threaded hole of the door frame 60 below the door 70 so as to fasten the connector 40 to the non-hinged rear surface (H') of the door 70. A crank pin unit 332 is mounted pivotally on the right end portion of the long member 30 and includes a stud 331, an upper tap bolt 332 extending through the circular hole 31 of the long member 30 to engage within the upper end of the stud 331, two washers 333, a lower tap bolt 334 extending through the washers 333 and the slide slot 44 to engage within the lower end of the stud 331, and a roller 335 sleeved rotatably on the stud 331. The short member 50 includes two parallel side walls 51 each of which has a square hole 52 and a circular hole 53.

Figure 7:
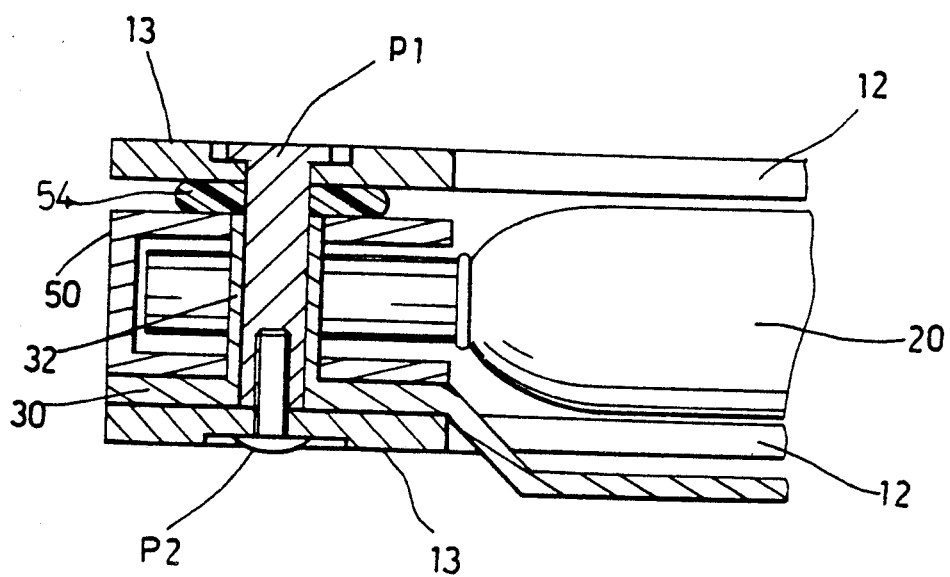

A coupling portion 32 of a square cross-section extends upward from the left end portion of the long member 30 and has a central bore 34 formed therethrough. To mount the crank unit on the support 10, the coupling portion 32 is inserted through the square holes 52 of the short member 50. Then, the assembly of the long member 30 and the short member 50 is placed between the large lugs 13 of the support 10 in such a manner that the central bore 34 of the coupling portion 32 is aligned with the circular holes 14 of the large lugs 13. Afterward, as shown in FIG. 7, a headed pin P1 is passed through the upper large lug 13, a washer 54, the central bore 34 of the coupling portion 32 and the lower large lug 13 to engage a tap bolt P2 with the threaded hole of the pin P1, thereby rotatably mounting the crank unit on the support 10. A pin 201 is passed through the circular holes 53 of the short member 50 and the hole in the left end portion of the body 20 so as to pivotally interconnect the body 20 and the short member 50.

Figure 3:
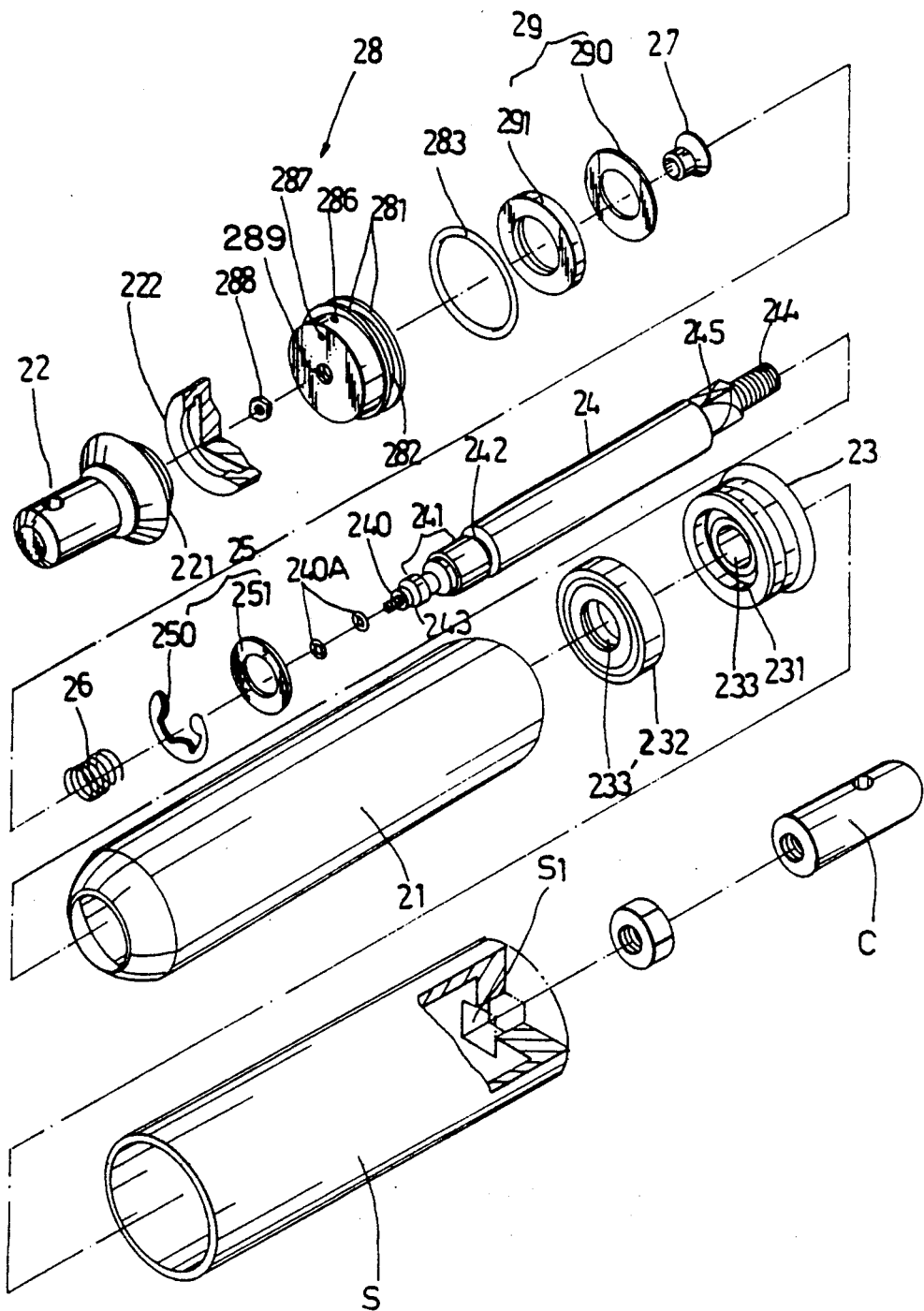
FIG. 3 is an exploded view showing the body of the door-closer according to this invention.
Figure 4:
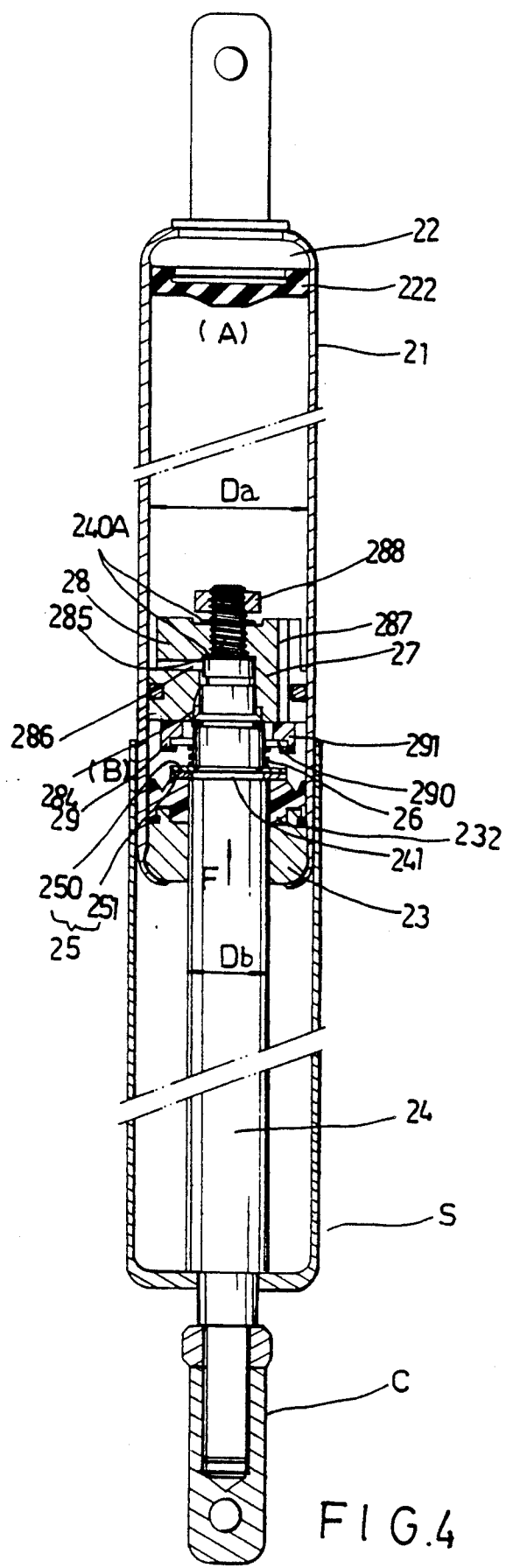
FIG. 4 is an assembled view showing the body of the door-closer according to this invention.

Referring to FIGS. 3 and 4, the body 20 includes an air cylinder 21, a cap 22 sealing the left end of the air cylinder 21, a guide ring 23 sealing the right end of the air cylinder 21, and a shielding cylinder S (see FIG. 4) covering the right end of the air cylinder 21 so as to prevent dust from entering the air cylinder 21. The cap 22 has an outward flange 221 at the inner end thereof which is engaged within the inner annular groove of a first rubber seal 222. The guide ring 23 includes an annular projection 231 provided on an end surface thereof which is engaged within the annular groove of a second rubber seal 232. A piston rod 24 extends through the central hole 233 of the guide ring 23 and the central hole 233' of the second seal 232.

The piston rod 24 has a threaded end portion 240, a stepped portion 241 adjacent to the threaded portion 240, and a first shoulder 242 adjacent to the stepped portion 241. A positioning means 25 is sleeved on the stepped portion 241 and includes a C-shaped retaining ring 250, and a first washer 251 which abuts against the first shoulder 242. A coiled compression spring 26 is also sleeved on the stepped portion 241 and abuts against the retaining ring 250 at one end thereof. The stepped portion 241 has a second shoulder 243 on which a funnel-like rubber sleeving 27 is sleeved snugly.

Figure 5:
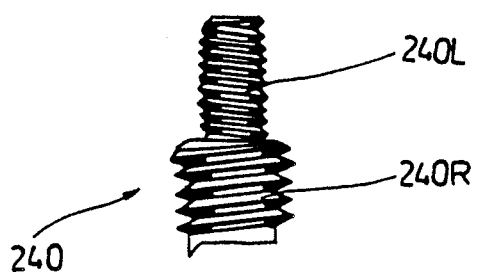
FIG. 5 is a schematic view illustrating an arrangement of right-hand and left-hand screws for retaining a piston body on a piston rod in accordance with this invention.

A piston body 28 divides the interior of the air cylinder 21 into two chambers A, B and includes two outward flanges 281 between which an annular groove 282 is formed. An O-ring 283 is engaged within the annular groove 282 so as to establish an air-tight seal between the piston body 28 and the air cylinder 21. A wedge-shaped groove 284 (see FIG. 4) is formed in the inner surface of the piston body 28 in communication with the chamber B. The rubber sleeving 27 can be carried by the piston rod 24 to move in a central bore 289 of the piston body so as to seal entirely or partially the wedge-shaped groove 284, thereby regulating the air flow through the wedge-shaped groove 284. Accordingly, the wedge-shaped groove 284 and the radial passage 286 together form a regulatable passage between the chambers A, B with the aid of two O-rings 240A which are sleeved on the threaded end portion 240 of the piston rod 24. The right end portion of the piston rod 24 has an externally threaded end 244 engaged threadedly with a pivoted connecting rod C, and a flattened portion 245 engaged with the rectangular hole S1 in the right end wall of the shielding cylinder S so that the rotation of the shielding cylinder S relative to the air cylinder 21 can move the piston rod 24 in the air cylinder 21. The threaded inner surface 285 of the piston body 28 engages with the right-hand screw portion 240R (see FIG. 5) of the piston rod 24. The radial passage 286 formed in the piston body 28 intercommunicates the wedge-shaped groove 284 and the chamber A. An axial passage 287 is formed through the piston body 28 intercommunicating the chambers A and B. A nut 288 is engaged with the left-hand screw end portion 240L of the piston rod 24 so as to retain the piston body 28 on the piston rod 24. The arrangement of the right-hand and left-hand screws provided on the piston rod 24 prevents the disengagement of the piston body 28 from the piston rod 24. The spring 26 is used to push a seal means 29 to close the axial passage 287 of the piston body 28. The seal means 29 consists of a second washer 290 attached to a rubber ring seal 291, and is sleeved on the piston rod 24 while still maintaining a clearance therebetween through which compressed air can flow. Normally, the piston rod 24 is located in a position relative to the air cylinder 21 so as to form an air passage in the wedge-shaped groove 284 of the piston body 28.

Referring to FIG. 4, when an associated door equipped with the pneumatic door-closer of this invention is pushed to open, a push force is applied to the piston rod 24 in the direction indicated by an arrow F so that the piston rod 40 moves upward, thereby compressing the air in the chamber A with the piston rod 24. The increased air pressure in the chamber A will urge the seal means 29 to move away from the piston body 28 against the bias force of the spring 26, thereby permitting the compressed air to flow from the chamber A to the chamber B through the radial passage 286 and the axial passage 287.

When the opened door is released, the push force to the piston rod 24 by the door is eliminated but is replaced with the following impelling static forces: (1) the push force Fa of the air pressure in the chamber A to the piston rod 24 and the piston body 28; (2) the push force Fb of the air pressure in the chamber B to the piston body 28; and (3) the push force Fc of the atmospheric pressure to the piston rod 24. When the opened door is released, the air pressure in the chamber A is the same as that in the chamber B. Fa is a downward force, while Fb and Fc are upward forces. Thus, the piston rod 24 will suffer from a downward resultant force Fa-Fb-Fc so as to move downward.

These impelling forces on the piston rod 24 can be expressed by the following formulas:

$$Fa = p \times \pi \times Da^2/4$$

$$Fb = p \times \pi \times (Da^2 - Db^2)/4$$

$$Fc = 1atm \times \pi \times Db^2/4$$

where P is the air pressure in either the chamber A or B, Da is the inner diameter of the air cylinder 21, and Db is the diameter of the middle of the piston rod 24.

As a result of these formulas, the force impelling the piston rod 24 downward $= Fa - Fb - Fc = (P-1) \times \pi \times (Db)^2/4$. The resultant impelling force to the piston rod 24 is proportional to the air pressure P in either the chamber A or B, and to the diameter Db of the middle of the piston rod 40.

Certainly, the resultant impelling force to the piston rod 24 will be diminished by the friction force between the air cylinder 21 and the O-ring 283 carried on the piston body 28.

It is stressed that the spring-biased seal means 29 acts as a check valve whereby the axial passage 287 can be automatically closed when the opened door is released. The closing speed of the door is therefore slow. However, the door can be opened rapidly due to the fact that compressed air can flow from the chamber A to the chamber B through two passages, i.e. axial passage 287 and the regulatable passage 284, 286.

It can be appreciated that the air flow between the chambers A and B can be regulated in accordance with the principle of a throttle valve. The relative movement between the piston rod 24 and the air cylinder 21 permits the air passage between the piston body 28 and the sleeving 27 to become larger or smaller for regulating the air flow between the chambers A and B through the regulatable passage 284, 286. A larger air passage formed from the wedge-shaped groove 284 allows easier opening of the door with less effect.

With the sleeving 27 provided on the shoulder 243 of the piston rod 24, when it is desired to locate the door in an open position, the sleeving 27 can be moved to seal the wedge-shaped groove 284 of the piston body 28 by moving the piston rod 24 relative to the air cylinder 21 so that the air flow between the chambers A and B through the regulatable passage 284, 286 is stopped.

Figure 8:
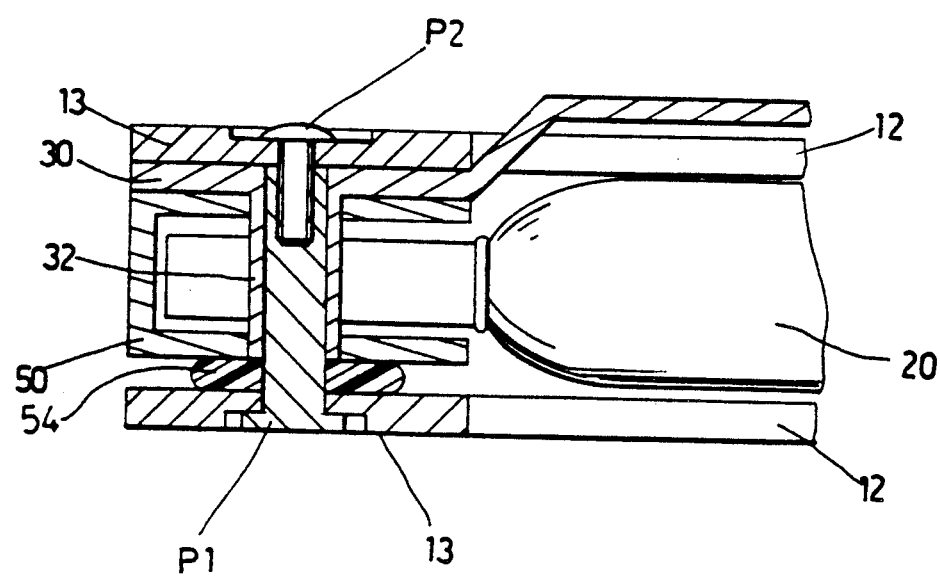
FIGS. 8 and 9 are schematic views illustrating how to utilize the door-closer of this invention on a door which is hinged to a door frame at the right side thereof.
Figure 9:
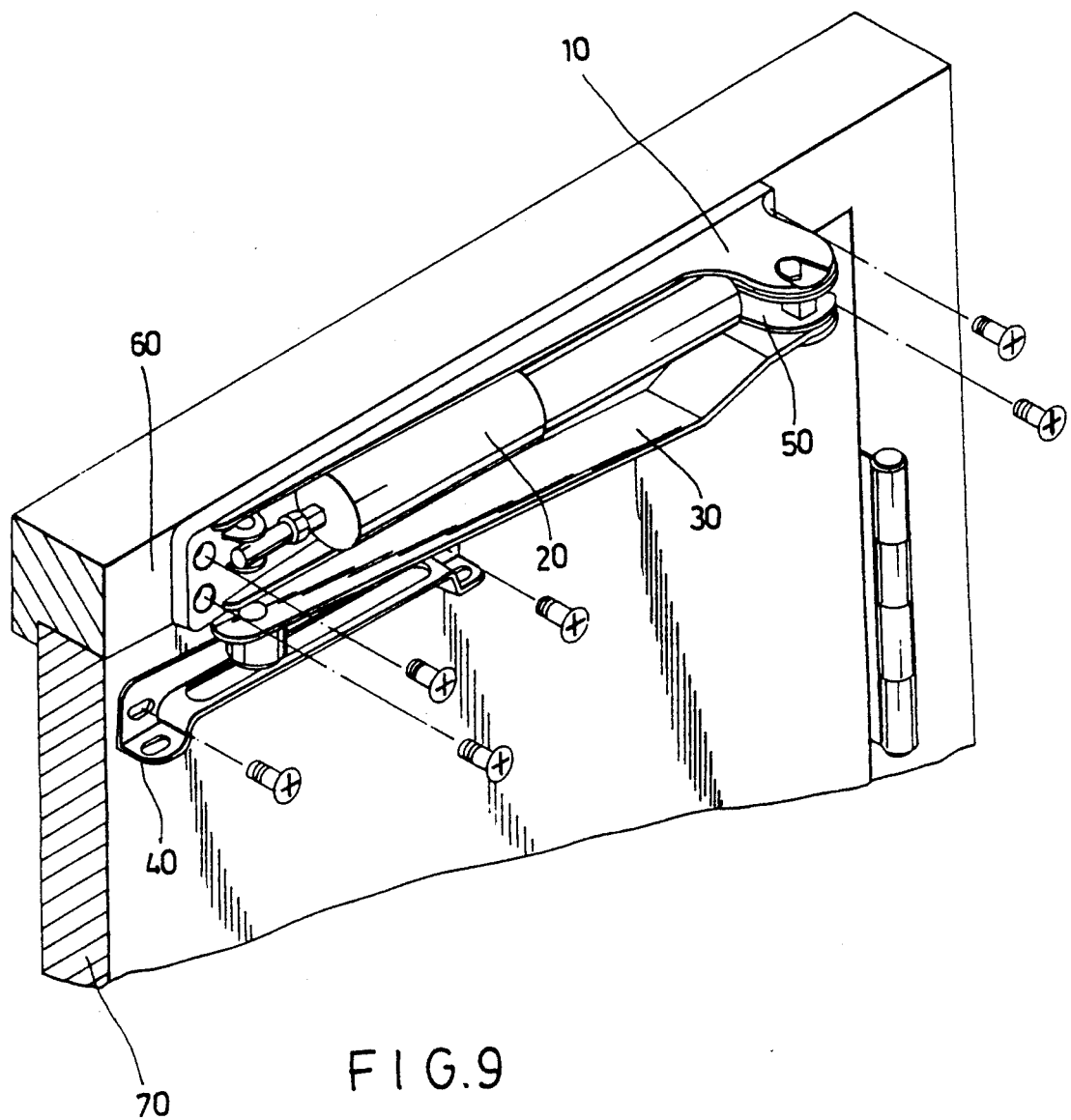

Referring to FIGS. 8 and 9, in a situation where the door 70 is hinged to the door frame 60 at the right side instead of the left side thereof, the crank unit is rearranged in such a manner that the long crank arm member 30 is moved to a position above the short crank arm member 50. Then, the pneumatic door-closer is inverted into the position shown in FIG. 9.

With this invention thus explained, it is apparent that numerous modifications and variations can be made without departing from the scope and spirit of this invention. It is therefore intended that this invention be limited only as indicated in the appended claims.

I claim:

1. A door-closer interposed between a door and a door frame, said door having a first side hinged to said door frame, and a second side opposite to and rotatable about said first side, said door-closer comprising:
   an elongated horizontal support fixed on said door frame above said door;
   a vertical pivot assembly positioned at one end of the support:
   a generally L-shaped crank unit pivoted removably to said end of said support by means of said pivot assembly and including a long crank arm member and a short crank arm member which inclines at an angle with respect to said long crank arm member, said long crank arm member being connected at a joint portion of said L-shaped crank unit to one side of said short crank arm member and including a crank pin unit carried at an end of said long crank arm member;
   a connector fixed on said door and having a slide slot formed therethrough in which said crank pin until of said long crank arm member is slideably received; and
   a door-closer body including an air cylinder filled with compressed air, and a piston rod extending through one end of said cylinder to connect pivotally with an end of said short crank arm member, the other end of said cylinder being mounted pivotally on the other end of said support, said cylinder including a piston body which is screwed movably on said piston rod so as to define in said cylinder a first and a second sealed chambers, said piston body including a central bore formed therethrough, a wedge-shaped groove formed in an inner surface of said piston body in communication with the second chamber, an axial passage formed through said piston body intercommunicating said first and second chambers, a spring-biased seal disposed in said second chamber and biased to close said axial passage, and a radial passage intercommunicating said wedge-shaped groove and said first chamber, said piston rod having a shoulder which is movable axially to seal entirely or partially said wedge-shaped groove by moving said piston rod relative to said cylinder and thereby regulated air flow between said first and second chambers;
   whereby, when said door is alternatively hinged to said door frame at said second side instead of said first side thereof, said support and said crank unit can be rearranged the other way round in such a manner that said long crank arm member is connected to the other side of said short crank arm member so that said door-closer can still perform the same door closing function.

2. The door-closer as claimed in claim 1, wherein said piston body has an internally threaded portion, said piston rod including a right-hand screw portion engaged threadedly within said internally threaded portion of said piston body, a left-hand screw end portion adjacent to said right-hand screw portion, and a nut engaged with said left-hand screw end portion, whereby, said piston body is retained on said piston rod.

3. The door-closer as claimed in claim 1, wherein said short crank arm member has a rectangular hole formed therethrough, said long crank arm member including a coupling portion of a rectangular cross-section shaped in comformity with said rectangular hole of said short crank arm member so as to engage said rectangular hole, said coupling portion having a central bore formed therethrough, said support including two aligned horizontal lugs each of which has a circular hole formed therethrough, said pivot assembly including a tap bolt, and a headed pin extending through said circular holes of said horizontal lugs and said central bore of said coupling portion to engage threadedly with said tap bolt so as to retain said long and short crank arm members on said pivot assembly, whereby, said long crank arm member can be adjusted to locate alternatively at either side of said short crank arm member for left-hinged or right-hinged door arrangement.

* * * * *